United States Patent Office 3,293,276
Patented Dec. 20, 1966

3,293,276
PROCESS FOR THE PRODUCTION OF
ISOTHIOCYANATES
Engelbert Kühle and Klaus Sasse, Cologne-Stammheim,
Germany, assignors to Farbenfabriken Bayer Aktienge-
sellschaft, Leverkusen, Germany, a German corporation
No Drawing. Filed July 2, 1963, Ser. No. 292,497
Claims priority, application Germany, July 20, 1962,
F 37,371
3 Claims. (Cl. 260—454)

The present invention relates to the production of a class of isothiocyanates processing nematicidal properties.

It is known that isothiocyanates may be obtained by reacting isocyanide dihalides with alkali metal, alkaline earth metal or ammonium salts of hydrogen sulphide or compounds containing sulphohydryl groups (cf. Belgian patent specification No. 613,428).

It has now been found that known isothiocyanate of the formula $$R-N=C=S$$
$$I$$

wherein

R stands for aliphatic, cycloaliphatic, araliphatic, aromatic or heterocyclic radicals which may be substituted by halogen, alkyl, haloalkyl and/or nitro, are also obtained by reacting isocyanide dihalides of the formula

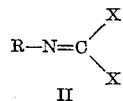

wherein

R has the same significance as in Formula I and
X stands for halogen, with sulphides of the formula $$Y_2S_5$$
$$III$$

wherein

Y stands for phosphorus, arsenic or antimony, in the presence of inert solvents.

It must be considered definitely surprising that the reaction according to the above-described invention proceeds smoothly, since it has hitherto not been known that the halogen, in halogen derivatives of carbon, can be exchanged for sulphur by the utilization of pentasulphide. The process according to the invention offers the advantage that even isocyanide dichlorides which are sensitive to hydrolysis can be converted.

If the process starts from phenyl-isocyanide dichloride and phosphorus pentasulphide, the course of the reaction according to the invention can be illustrated by the following scheme:

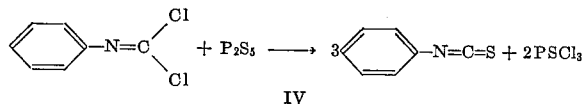

The isocyanide dihalides which can be used for the process according to the invention are unequivocally characterised by the above Formula II. Therein R stands preferably for alkyl with 1 to 15 carbon atoms, cycloalkyl with 5 to 6 carbon atoms, benzyl, phenyl, naphthyl or heterocyclic radicals with 5 to 6 ring members. These radicals may preferably be substituted by chlorine, bromine, fluorine, or alkyl with 1 to 4 carbon atoms, haloalkyl and/or nitro. X stands preferably for chlorine, bromine or fluorine.

Examples of isocyanide dihalides suitable for this reaction are methyl-, butyl-, dodecyl-, cyclohexyl-, benzyl- and phenyl-isocyanide dichloride, phenyl-isocyanide difluoride, phenyl-isocyanide dibromide, 4-chlorophenyl-, 3-nitrophenyl-, naphthyl-isocyanide dichloride and tetrameric cyanochloride.

The pentasulphide of phosphorus, arsenic or antimony is used as reaction partner.

All inert organic solvents can be used as diluents. Especially suitable are aliphatic and aromatic hydrocarbons such as benzine, xylene and toluene, as well as chlorinated aliphatic and aromatic hydrocarbons such as trichloroethane and chlorobenzene. The reaction according to the invention can be carried out within a fairly wide range of temperature. In general, the process is carried out at between 80 and 220° C., preferably between 100 and 150° C.

For carrying out the reaction, the starting components are expediently added to an inert solvent, and the mixture is heated until the pentasulphide is completely dissolved. After distilling off the solvent and the sulphochloride formed, the isothiocyanates can be directly isolated by distillation.

The isothiocyanates obtainable according to the invention are already known (cf. Belgian patent specification No. 613,428).

The substances according to the invention have strong nematicidal properties and only a slight toxicity towards warm-blooded animals, and they can therefore be used for combating nematodes, especially phytopathogenic nematodes.

These essentially comprise leaf nematodes (Aphelenchoides), such as affecting chrysanthemum (A. ritzemabosi), strawberries (A. fragariae), rice (A. oryzae); stalk nematodes (Ditylenchus), such as D. dipsaci; root gall nematodes (Meloidogyne) such as M. arenaria and M. incognita; cyst-forming nematodes (Heterodera) such as affecting potatoes (H. rostochiensis), turnips (H. schachtii); as well as free-living root nematodes, for example of the species Protylenchus, Paratylenchus, Rotylenchus, Xyphinema and Radopholus.

Isothiocyanates having an aromatic nucleus which contains halogen substituents are especially effective.

The substances according to the invention can be used as such or in the form of customary formulations, such as emulsifiable concentrates, wettable powders, pastes, soluble powders, dusts and granulates. These are prepared in known manner (cf. Agricultural Chemicals, March 1960, pages 35–38). Auxiliaries for this purpose are chiefly: solvents such as aromatics (e.g. xylene, benzene), chlorinated aromatics (e.g. chlorobenzene), paraffins (e.g. petroleum fractions), alcohols (e.g. methanol, butanol), amines (e.g. ethanolamine, dimethyl formamide), and water; carrier substances, such as natural rock flours (e.g. highly dispersed silicic acid, silicates); emulsifiers, such as non-ionic and anionic emulsifiers (e.g. polyoxyethylene fatty acid esters, polyoxyethylene fatty alcohol ethers, alkyl sulphates, and aryl sulphonates), and dispersing agents, such as lignin, sulphite waste liquors and methyl cellulose.

The active substances according to the invention may be present in the formulations in admixture with other known active ingredients.

The formulations contain, in general, between 0.1 and 95, preferably between 0.5 and 90, percent by weight of active substance.

The substances obtainable according to the invention or their formulations can be used in customary manner, e.g. by pouring, spraying, scattering and milling in, by injecting into the soil, and for treatment of the plough burrows.

The following examples are given for the purpose of illustrating the invention.

*Example 1*

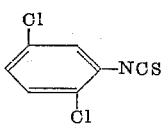

73 g. of 2,5-dichlorophenyl-isocyanide dichloride and 22.2 g. of phosphorus pentasulphide are heated in 200 ml. of xylene at boiling temperature for 10 hours, until dissolved. When the dissolution is complete, the mixture is concentrated in a vacuum, and by subsequent distillation there are obtained 56 g., i.e. 91% of the theoretical of 2,5-dichlorophenyl isothiocyanate of B.P. 143–147° C. at 12 mm. Hg.

*Example 2*

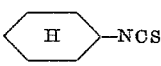

54 g. of cyclohexyl isocyanide dichloride are heated, with the addition of 22.2 g. of phosphorus pentasulphide, in 150 ml. of xylene for 2 hours until dissolved. 35 g., i.e. 82.5% of the theoretical, of cyclohexyl isothiocyanate of boiling point 96–99° C. at 11 mm. Hg. are obtained after concentration.

*Example 3*

In analogy with the method according to Example 1, suitable isocyanide dichlorides are reacted with phosphorus pentasulphide to give the following compounds:

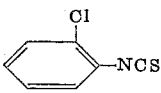

B.P.: 120–122° at 12 mm. Hg.

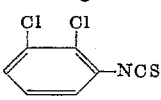

B.P.: 145–148° at 10 mm. Hg.

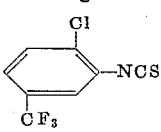

B.P.: 114–117° at 12 mm. Hg.

*Example 4*

In order to determine the nematicidal activity, the compounds indicated below are mixed, in the dosages as specified in pots with ½ litre of soil contaminated with Meloidogyne spec. The sealed pots are allowed to stand at 20° C. for one week, then sown with lettuce and allowed to stand at 27° C. After a further 4 weeks, the roots are evaluated in respect of infestation with galls. Comparison with the untreated control shows the following degrees of merit in percent. Thereby 100% denotes that infestation has been completely avoided; 0% denotes that the treated plants have been infested to the same extent as the untreated control plants.

TABLE

| | Destruction in percent at concentrations of— | | |
|---|---|---|---|
| | 200 p.p.m. | 100 p.p.m. | 50 p.p.m. |
| 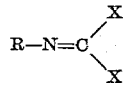—NCS | 100 | 100 | 100 |
| (2,6-dichloro)—NCS | 100 | 98 | 80 |
| (monochloro)—NCS | 100 | 100 | 100 |
| (Cl, CF₃)—NCS | 100 | 98 | 95 |
| —NCS | 100 | 100 | 0 |

We claim:
1. A process for the production of isothiocyanates which comprises heating an isocyanate dihalide of the formula

$$R-N=C\begin{matrix}X\\X\end{matrix}$$

wherein
R is a member selected from the group consisting of alkyl of 1–15 carbon atoms, cycloalkyl of 5–6 carbon atoms, benzyl, phenyl, naphthyl, and the substitution product thereof, the substituent consisting of at least one member selected from the group consisting of chloro, bromo, fluoro, alkyl of 1–4 carbon atoms, haloalkyl of 1–4 carbon atoms and nitro; and
X is a member selected from the group consisting of chloro and bromo;
together with a pentasulphide of the formula $$Y_2S_5$$

wherein
Y is a member selected from the group consisting of phosphorus, arsenic and antimony; the reaction being effected in the presence of an inert organic solvent at a temperature of about 80–220° C.; and recovering the resulting isothiocyanate product.

2. A process according to claim 1 wherein the reaction is effected at a temperature of 100° C.–150° C.

3. A process according to claim 1 wherein the inert organic solvent is a member selected from the group consisting of aliphatic, aromatic, chlorinated aliphatic and chlorinated aromatic hydrocarbons.

References Cited by the Examiner

UNITED STATES PATENTS

| 1,993,040 | 3/1935 | Salzberg et al. | 260—454 |
| 2,029,959 | 2/1936 | Urbain | 260—454 |
| 2,080,770 | 5/1937 | Goldschmidt et al. | 260—454 XR |
| 2,217,611 | 10/1940 | Borglin | 260—454 |
| 2,217,612 | 10/1940 | Borglin | 260—454 |
| 2,226,984 | 12/1940 | Sloan | 260—454 |
| 2,618,582 | 11/1952 | Buckmann | 167—30 |
| 2,642,373 | 6/1953 | Dazzi | 167—30 |
| 2,681,358 | 6/1954 | Wirth | 260—454 |

CHARLES B. PARKER, *Primary Examiner.*
JOSEPH P. BRUST, *Examiner.*
D. R. MAHANAND, *Assistant Examiner.*